US 6,691,189 B2

(12) United States Patent
Fujikawa

(10) Patent No.: US 6,691,189 B2
(45) Date of Patent: Feb. 10, 2004

(54) POINTING DEVICE WITH A CONTROLLER FOR MONITORING A PROTOCOL SELECTOR SIGNAL DERIVED FROM A COMPUTER TO SELECT ONE OF A COMPATIBILITY FUNCTION AND AN ADDITIONAL FUNCTION

(75) Inventor: Reiji Fujikawa, Minato-ku (JP)

(73) Assignee: NEC Corporation (JP)

( * ) Notice: Subject to any disclaimer, the term of this patent is extended or adjusted under 35 U.S.C. 154(b) by 91 days.

(21) Appl. No.: 09/970,512

(22) Filed: Oct. 4, 2001

(65) Prior Publication Data
US 2002/0023183 A1 Feb. 21, 2002

Related U.S. Application Data

(62) Division of application No. 09/170,828, filed on Oct. 13, 1998, now Pat. No. 6,321,281.

(30) Foreign Application Priority Data

Oct. 14, 1997 (JP) .............................. 9-280717

(51) Int. Cl.⁷ .............................. G06F 13/14
(52) U.S. Cl. .................. 710/73; 710/129; 345/163; 345/169; 345/173
(58) Field of Search .................. 710/73, 129; 345/163, 345/169, 173

(56) References Cited

U.S. PATENT DOCUMENTS

| 5,063,376 A | * 11/1991 | Chang ......................... 345/163 |
| 5,298,919 A | * 3/1994 | Chang ......................... 345/163 |
| 5,339,095 A | 8/1994 | Redford ....................... 345/158 |
| 5,414,422 A | 5/1995 | Allen .......................... 341/22 |
| 5,457,480 A | * 10/1995 | White .......................... 345/163 |
| 5,633,489 A | 5/1997 | Dvorkis et al. ............. 235/472 |
| 5,659,335 A | 8/1997 | Partridge, III .............. 345/157 |
| 5,661,505 A | 8/1997 | Livits ......................... 345/169 |
| 5,701,175 A | 12/1997 | Kostizak et al. ............. 356/326 |
| 5,736,978 A | 4/1998 | Hasser et al. ................ 345/173 |
| 5,805,144 A | * 9/1998 | Scholder et al. ............. 346/163 |
| 5,814,804 A | 9/1998 | Kostizak ................. 235/472.01 |
| 5,847,695 A | 12/1998 | Duncan et al. ............. 345/163 |
| 5,909,209 A | * 6/1999 | Dickinson ................... 345/163 |
| 5,912,660 A | 6/1999 | Gouzman et al. ........... 345/163 |

(List continued on next page.)

FOREIGN PATENT DOCUMENTS

| JP | 1-248256 | 10/1989 |
| JP | 3-50653 | 3/1991 |
| JP | 3-98109 | 4/1991 |
| JP | 3-208115 | 9/1991 |
| JP | 7311640 | 11/1995 |
| JP | 8-6691 | 1/1996 |
| JP | 8-287006 | 11/1996 |
| JP | 9-259079 | 10/1997 |
| JP | 63-127323 | 5/1998 |
| JP | 10-177445 | 6/1998 |

Primary Examiner—Abdelmoniem Elamin
(74) Attorney, Agent, or Firm—Dickstein, Shapiro, Morin & Oshinsky, LLP.

(57) ABSTRACT

A pointing device has a controllable selector for sending a version compatible signal and a newer functionality signal to a computer terminal. The pointing device has an operating unit which produces a signal which can be passed directly to the computer terminal, or can be modified with a new functionality, and then passed to the computer terminal. A controller in the pointing device monitors a protocol signal line to determine whether a version compatible signal or a new functionality signal is called for. The controller can activate a new functionality circuit and the selector to send the appropriate signal to the computer terminal. The controller can also monitor the protocol signal line in a power-on state, and execute a procedure to determine the functionality requested by the protocol signal line.

2 Claims, 4 Drawing Sheets

U.S. PATENT DOCUMENTS

| | | | |
|---|---|---|---|
| 5,936,555 A | 8/1999 | Zagnoev | 341/22 |
| 5,949,401 A | 9/1999 | Kazarian | 345/156 |
| 6,011,541 A | 1/2000 | Klein | 345/156 |
| 6,011,542 A | 1/2000 | Durrani et al. | 345/156 |
| 6,036,094 A | 3/2000 | Goldman et al. | 235/462.45 |
| 6,044,428 A | 3/2000 | Rayabhari | 710/129 |
| 6,055,592 A | 4/2000 | Smith | 710/73 |
| 6,088,022 A | 7/2000 | Rakoski | 345/168 |
| 6,100,875 A | 8/2000 | Goodman et al. | 345/163 |
| 6,137,479 A * | 10/2000 | Olsen et al. | 345/169 |
| 6,166,721 A | 12/2000 | Kuroiwa et al. | 345/163 |
| 6,321,281 B1 * | 11/2001 | Fujikawa | 710/73 |
| 6,326,935 B1 * | 12/2001 | Boger | 345/302 |

* cited by examiner

POINTING DEVICE WITH A CONTROLLER FOR MONITORING A PROTOCOL SELECTOR SIGNAL DERIVED FROM A COMPUTER TO SELECT ONE OF A COMPATIBILITY FUNCTION AND AN ADDITIONAL FUNCTION

BACKGROUND OF THE INVENTION

The present application is a divisional of U.S. patent application Ser. No. 09/170,828, filed Oct. 13, 1998 now U.S. Pat. No. 6,321,281, in the name of Reiji Fujikawa and entitled POINTING DEVICE WITH A CONTROLLER USED FOR MONITORING A PROTOCOL SELECTOR SIGNAL DERIVED FROM A COMPUTER TO SELECT ONE OF A COMPATIBILITY FUNCTION AND AN ADDITIONAL FUNCTION and claims priority of Japanese Patent Application No. Hei-9-280717 filed on Oct. 14, 1997, both of which are herein incorporated by reference.

1. Field of the Invention

The present invention generally relates to a pointing device, a computer connectable with a pointing device, and a method for controlling a relationship between a computer and 10 such a pointing device. More specifically, the present invention is directed to such a novel pointing device capable of entering various input data indicative of characters, symbols, and functions while maintaining compatibility with presently available pointing devices.

2. Description of the Related Art

Conventionally, pointing devices are used in personal computer systems. One mouse input system in, for instance, Japanese Patent Laid-open Hei3-98109. The previously disclosed, mouse input system is capable of entering various input indicative of characters, symbols, and functions in response to cursor positions on the display screen, in addition to serving as a pointing device.

Precisely speaking, pointing device, when the position of the pointing device is changed, pulse signals are produced in response to the amount of change. The pulse signals are transferred directly to a personal computer through switches in the pointing device. As a consequence, the structure of this typical pointing device is made very simple. However, when the mouse input system proposed in the above-described Japanese Patent Laid-open Publication No. Hei3-98109 is applied to the above-explained typical pointing device, signal lines and connectors must be newly defined between the mouse system and the personal computer.

Also, when a new connector is introduced, the above pointing device is no longer connection-compatible with the main body of the personal computer. The mouse input system with new features is thus not compatible with the personal computer which has a standard connector.

SUMMARY OF THE INVENTION

The present invention has been made to solve the above-described problems, and therefore, has an object to provide a novel pointing device equipped with a new function without requiring a new signal line. The requirement of a new connector between this pointing device and a main body of a personal computer is eliminated. Another object of the present invention is to provide a control method for controlling functions between a new function pointing device and a computer, while using pointing devices without having the new function.

To achieve the above-described objects, first aspect of the present invention, there pointing device comprising:

a pointing device operating unit for producing an operation signal every time the pointing device is operated:

a compatibility function signal producing circuit for producing a signal indicative of an original compatibility function of the pointing device in response to the operation signal produced from the pointing device operating unit;

an additional function signal producing circuit for changing the operation signal produced from the pointing device operating unit into a signal indicative of an additional function to thereby produce an additional function signal;

a selector for selectively supplying any one of the compatibility function signals produced from the compatibility function signal producing circuit and the additional function signal produced from the additional function signal producing circuit to a computer main body connectable to the pointing device; and a controller for monitoring a protocol selector signal derived from the computer main body immediately after a power supply of the computer main body is turned ON, and for controlling the selector to selectively supply the additional function signal produced from the additional function signal producing circuit to the computer main body in such a way that the protocol selector signal satisfies a condition under which an operation mode is changed into an additional function mode where the additional function of the pointing device is executed.

Also, according to a second aspect of the present invention, there is provided a pointing device in which the additional function signal producing circuit receives a command/data signal via the selector from the computer main body to analyze a command and data from the received command/data.

Also, according to a third aspect of the present invention, there is provided a pointing device in which the command/data signal contains at least data defined by a move amount of the pointing device, a change of sensitivities of the pointing device, and a temporary stop of an information supply.

Also, according to a fourth aspect of the present invention, there is provided a pointing device in which the pointing device is a mouse; and the additional function signal produced from the additional function signal producing circuit contains at least a mouse data signal, a mouse clock signal, and a CPU data signal.

Also, according to a fifth aspect of the present invention, there is provided a pointing device in which the protocol selector signal is connected via a resistor to the power supply of the computer main body.

Furthermore, according to a sixth aspect of the present invention, there is provided a method for controlling a pointing device and a computer main body connectable with the pointing device comprising:

a step in which when the pointing device is connected to the computer main body, a protocol is transmitted/received between the pointing device and the computer by using an undefined signal line among signal lines of a connector for connecting the pointing device to the computer main body;

a step in which while transmitting/receiving the protocol, controllers employed in both the pointing device and the computer main body confirm states of the counterpart controllers; and a step in which when such a confirmation is established that both the pointing device and the computer main body are capable of utilizing an additional function of the pointing device, an operation condition of the computer main body is brought into an additional function condition.

Also, according to a seventh aspect of the present invention, there is provided a control method further comprising:

a step in which while a power supply of the computer main body is turned ON and/or reset so as to bring the computer main body into a waiting state, when the pointing device having the additional function is connected to the computer main body under waiting state, both the pointing device having the additional function and the computer main body are operated in an original compatibility mode thereof;

a step in which a protocol transmission/reception operation is carried out between a controller employed in the pointing device and another controller employed in the computer main body in order to check as to whether or not the additional function of the pointing device is usable; and a step in which when a mode switching instruction is issued from a central control apparatus of the computer main body to both the controllers after both the controllers confirm that the additional function can be used, the operation modes of both the pointing device and the computer main body are switched into additional function modes.

Moreover, according to an eighth aspect of the present invention, there is provided a computer connectable with a pointing device comprising:

a central control apparatus for executing an original compatibility function of the pointing device upon receipt of an original compatibility function control signal, and for executing an additional function of the pointing device upon receipt of an additional function control signal;

an additional function control circuit for providing an additional function signal transmitted with pointing device control signal from the pointing device to thereby output the additional function control signal to the central control apparatus;

a compatibility function providing circuit for providing an original compatibility function signal transmitted with the pointing device control signal from the pointing device to thereby output the additional function control signal to the central control apparatus;

a selector for selectively supplying the pointing device control signal derived from the pointing device to the compatibility function providing circuit and the additional function control circuit; and a controller for controlling a protocol selector signal transmitted/received between the computer controller and the pointing device in response to an instruction issued from the central control apparatus, and for transferring the controlled protocol selector signal to the central control apparatus and also for controlling the selector based upon the controlled protocol selector signal.

Also, according to a ninth aspect of the present invention, there is provided a computer connectable with a pointing device, in which the controller controls the selector when a power supply of the computer is turned ON in such a manner that the selector outputs the pointing device control signal to the compatibility function providing circuit, whereby the pointing device is operated in an 10original compatibility function mode;

when the protocol selector signal is changed and thereafter the controller confirms that the additional function of the pointing device is usable, the controller notifies the confirmation to the central control apparatus; and when an operation mode switching instruction is issued from the central control apparatus, the controller switches the operation mode of the pointing device into the additional function mode by controlling the selector in response to the 20 protocol selector signal.

As a consequence, any pointing devices which do not possess new functionality may still be connected to the computer and operate compatibility.

BRIEF DESCRIPTION OF THE DRAWINGS

The above and other objects, advantages and features of the present invention will be more apparent from the following description taken in connection with the accompanying drawings, in which.

DESCRIPTION OF THE PREFERRED EMBODIMENTS

Referring now to drawings, various preferred embodiments of the present invention will be described.

Figure 1:
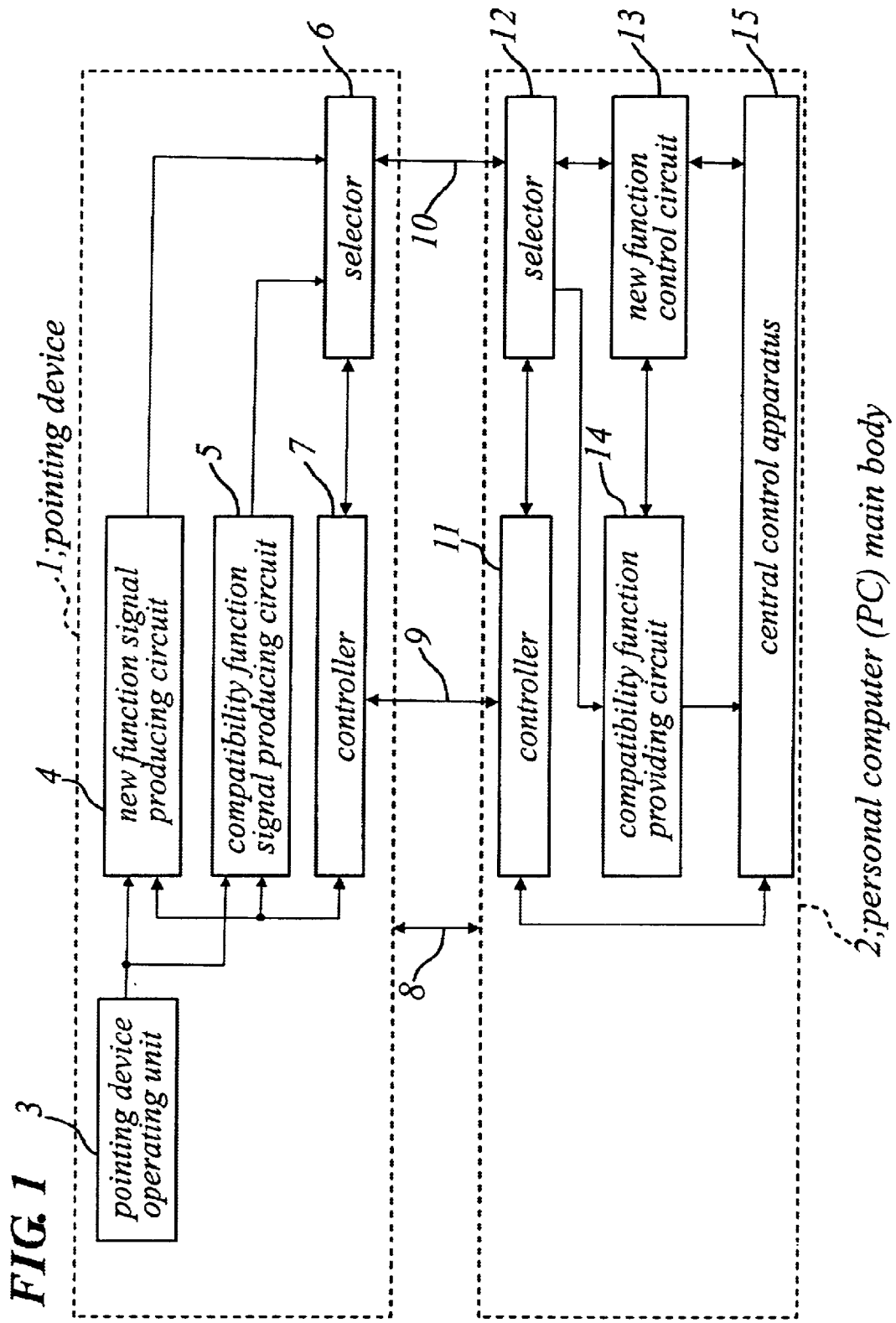
FIG. 1 is a schematic block diagram for representing a pointing device and a pointing device signal analyzing unit of a personal computer, according to an embodiment of the present invention.

FIG. 1 is a block diagram showing a pointing device 1 according to an embodiment of the present invention, and a personal computer(PC) main body 2 connectable with the pointing device 1. Referring now to FIG. 1, the pointing device 1 contains a pointing device operating unit 3, a new function signal producing circuit 4, a compatibility function signal producing circuit 5, a selector 6 and a controller 7. Also, the personal computer main body 2 is equipped with a pointing device signal analyzing unit arranged with a controller 11, a selector 12, a new function control circuit 13, a compatibility function providing circuit 14 and a central control apparatus 15.

The pointing device operating unit 3 sends a signal to the new function signal generating circuit 4 and the compatibility function signal generating circuit 5 whenever the pointing device 1 is operated.

The new function signal producing circuit 4 receives the signal and converts this signal into another signal having a signal format conforming to a new function control format, and then transmits this converted signal to the selector 6. The new function signal producing circuit 4 can receive another signal via the selector 6 from the personal computer main body 2. The new functions signal producing circuit 4 executes an analyzing process operation for this signal to acquire a command and data. The signal received from the personal computer main body 2 corresponds to data produced in response to an amount of movement of the pointing device 1. The signal can also include data related to a change in a sensitivity of the pointing device 1, for indicating that a supply of information is temporarily stopped, and so on. Upon receipt of the signal supplied from the pointing device operating unit 3, the compatibility function signal producing circuit 5 produces a signal compatible with the received signal, and then transmits this produced signal to the selector 6. It should be noted that this signal produced by the compatibility function signal producing circuit 5 corresponds to the conventional bus mouse type signal, and will be referred to as a compatibility signal hereinafter.

The controller 7 monitors a protocol selector signal 9 immediately after a power supply is turned ON. When protocol selector signal 9 can satisfy a condition used to change the operation mode into a new function mode, the controller 7 sends a signal to the selector 6. When the condition is satisfied, the new function of the pointing device 1 can be executed. Upon receipt of the signal sent from the controller 7, the selector 6 connects an output signal derived from either the compatibility function signal producing circuit 5 or the new function signal producing circuit 4 to a pointing device control signal 10. A power supply/ground signal 8 is employed as a reference power supply voltage and a ground potential for the personal computer main body 2 and the pointing device 1. The protocol selector signal 9 is transferred between the controller 7 and the controller 11. In an apparatus and a pointing device, which can produce only the compatibility signal, this protocol selector signal 9 is communicated with a signal pin defined as NC (Not Connected). It should be understood that the pointing device control signals 10 are relayed through a plurality of signal lines connected between the selector 6 of the pointing device 1 and the selector 12 of the PC main body 2.

The controller 11 receives an instruction issued from the central control apparatus 15 to thereby control the protocol selector signal 9. The controller 11 transfers the controlled result to the central control apparatus 15 and also controls the selector 12. In other words, (1) The controller 11 continuously monitors the protocol selector signal 9.

(2) The controller 11 sends out a specific timing signal (switching this signal as free/OV).

(3) The controller 11 monitors the protocol selector signal 9 for any change at the expected timing.

(4) If the protocol selector signal 9 is changed at the expected timing, then the controller 11 notifies the central control apparatus 15 that an expected pointing device is connected. When a request is made from the central control apparatus 15 to change the operation mode to the new function mode, the controller 11 again notifies the central control apparatus 15 of the change in the protocol selector signal 9.

In response to an instruction issued from the controller 11, the selector 12 connects the pointing device control signal 10 to either the new function control circuit 13 or the compatibility function providing circuit 14. The compatibility function providing circuit 14 can directly receive the signal 10 supplied from the selector 12 and transfer the received signal 10 to the central control apparatus 15. Alternatively, the compatibility function providing circuit 14 can receive a signal supplied from the new function control circuit 13 and convert the received signal into an element usable with the compatibility function (that is, a signal related to counter, right button information and left information). The compatibility function control circuit 14 transfers the converted element to the central control apparatus 15. In the new function control circuit 13, a signal is transferred to the compatibility function providing circuit 14 and another signal is transferred to the central control apparatus 15.

Figure 5:
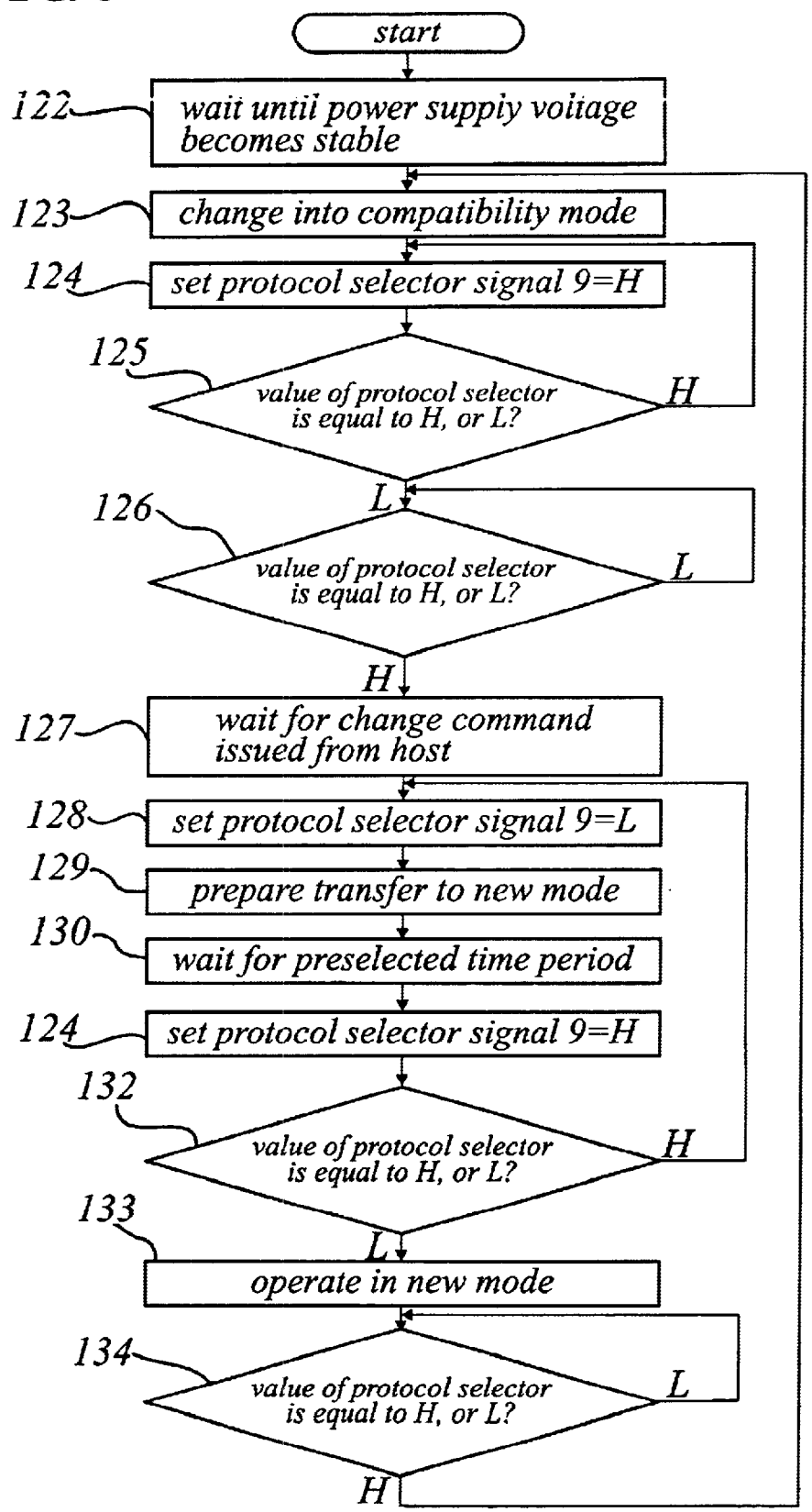
FIG. 5 is a flow chart for describing process operation 15 of a controller 11 employed in the computer of FIG. 1.

Referring also to a flow chart shown in FIG. 5, the operation of the pointing device 1 is shown. First, the operation of the pointing device equipped with the new function is described when it is connected to the new-function-installed computer.

When the power supply of the personal computer main body 2 is turned ON, all of the modules are initialized in response to a reset signal (not shown). When the initialization is performed, the controller 11 commences an operation process in accordance with the flow chart shown in FIG. 5. The controller 11 issues an instruction to the selector 12 to switch the operation mode into the compatibility mode one time at a step 123. Step 123 occurs after the overall system has waited for the power supply voltage to become stable at a step 122. Upon receipt of the instruction from controller 11, the selector 12 selects the internal circuit to connect the pointing device control signal 10 to the compatibility function providing circuit 14.

Figure 2:
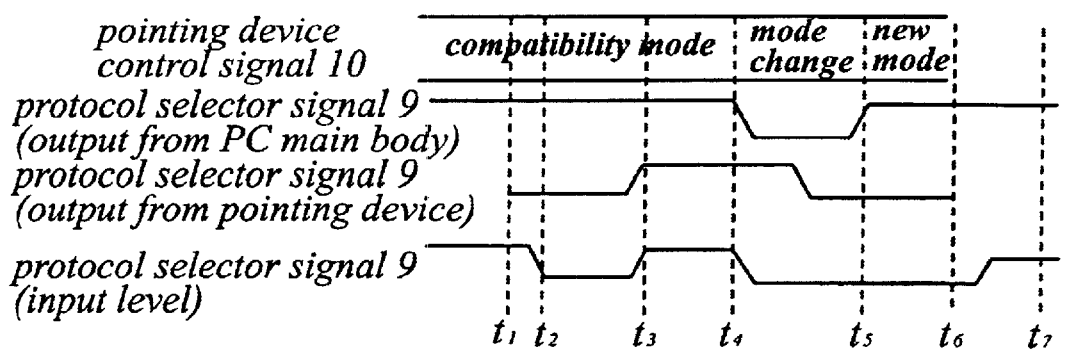
FIG. 2 is a timing chart for representing a change in a protocol selector signal 9 of the pointing device according to the embodiment.
Figure 3:
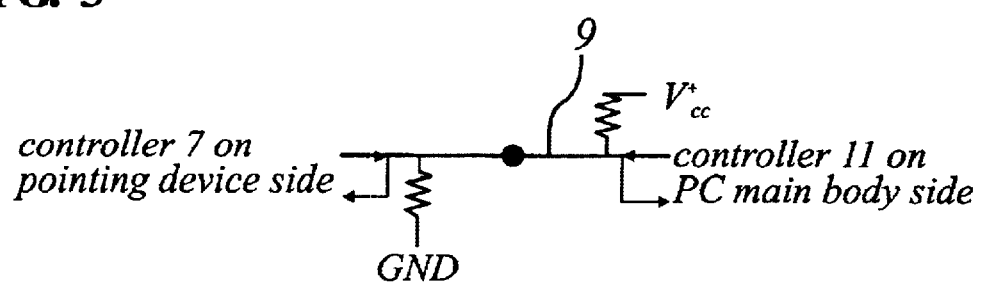
FIG. 3 illustratively shows a connecting example of a protocol selector signal line of the pointing device shown in FIG. 1.
Figure 4:
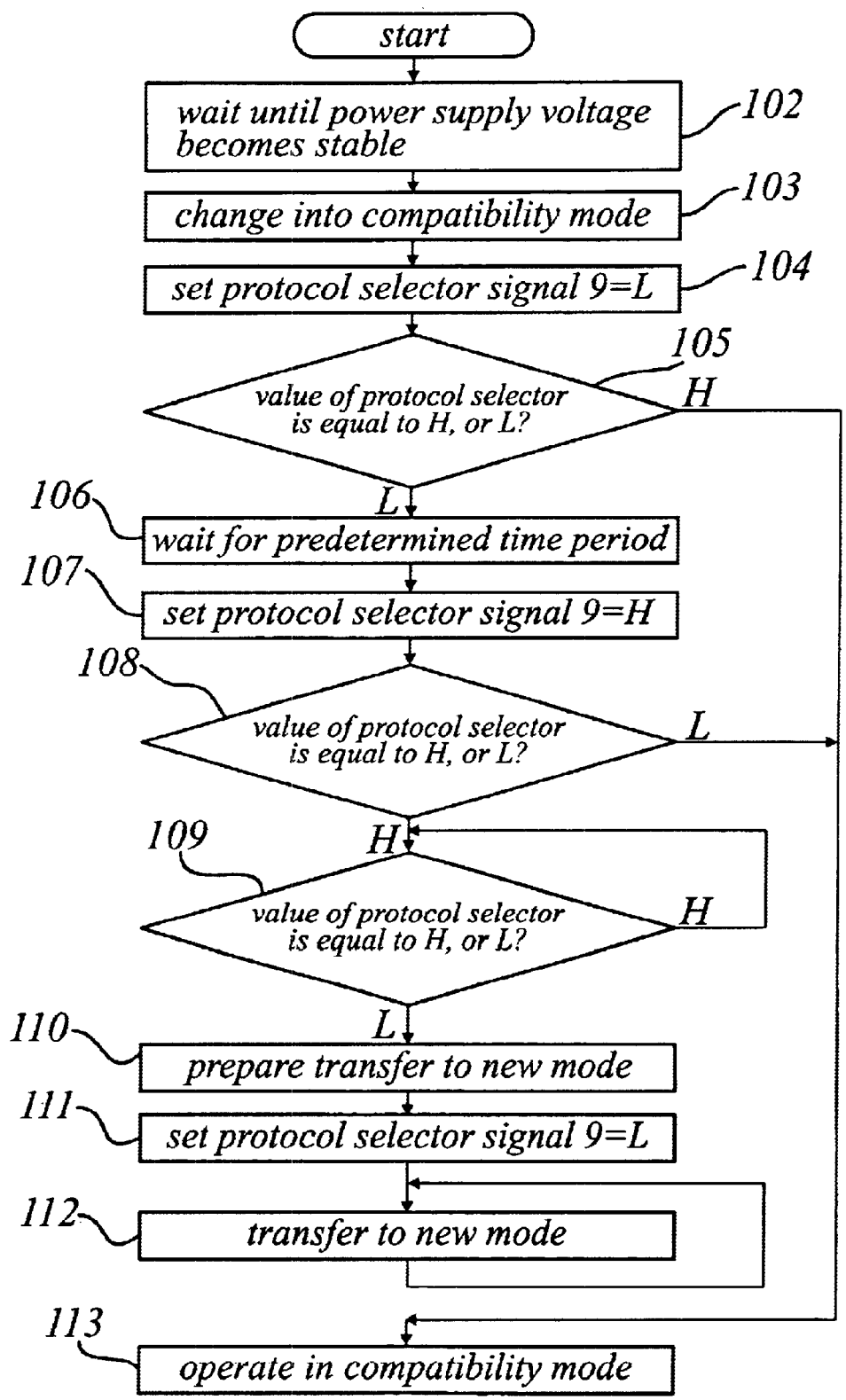
FIG. 4 is a flow chart for describing a process of operation of a controller 7 employed in the pointing device of FIG. 1.

At a further step 124, the level of the protocol selector signal 9 is held at a high level H. Both the controller 11 provided on the PC main body side and the controller 7 provided on the pointing device side are capable of performing Nch-open drain control. As indicated in FIG. 3, the protocol selector signal 9 is connected via a resistor to the power supply on the side of the personal computer main body 2. This connection sets the level of the protocol selector signal 9 to a high level, as indicated in a time instant t1 of the timing chart shown in FIG. 2. When the electric power is supplied via the power supply signal 8 to the pointing device 1 under the condition, this pointing device 1 commences operation. After the internal data (namely, internal information required to operate a microprocessor) of the pointing device 1 has been initialized, the operation of the controller 7 is commenced as shown in FIG. 4. The controller 7 is brought into a waiting state until the power supply voltage becomes stable at a step 102.

At a step 103, the controller 7 issues an instruction to the selector 6 to switch the operation mode into the compatibility mode. Upon receipt of this instruction, the selector 6 causes the signal derived from the compatibility function signal generating circuit 5 to pass through the selector 6 and to be transferred to the pointing device control signal 10.

Under this condition, the signal produced from the pointing device operating unit 3 is supplied to the new function signal producing circuit 4 and the compatibility function signal producing circuit 5.

A signal capable of supporting a new function is produced from the new function signal producing circuit 4, and the new-function supporting signal is sent to the selector 6.

As the signal capable of supporting the new function, the below-mentioned signals are conceivable:

MD: mouse data signal (Nch-open drain),
data is sent out in synchronism with an MC signal, and is changed by the pointing device 1.

MC: mouse clock signal (Nch-open drain),
set mouse data H→L→H (being changed by the pointing device 1),
refuse data acceptance H→L (being changed on the CPU side),
allow data acceptance L→H (being changed on the CPU side)

CD: CPU data signal (Nch-open drain), since data is sent out in synchronism with a CC signal, this CPU data signal is changed on the PC side.

CC: CPU clock signal (Nch-open drain),
set mouse data H→L→H (being changed on the PC side),
refuse data acceptance H→L (being changed by the pointing device 1),
allow data acceptance L→H (being changed by the pointing device 1)

Similarly, a compatibility signal is produced from the compatibility function signal producing circuit 5 and sent to the selector 6. The selector 6 receives both the signal capable of realizing the new function and the signal capable of realizing the compatibility function. Since the compatibility function signal producing circuit 5 is being connected to the pointing device control signal 10, the compatibility signal is sent to the selector 12 in the personal computer main body 2. The selector 12 in the personal computer main body 2 can send the compatibility signal to the compatibility function providing circuit 14, which can provide the compatibility function to the central control apparatus 15.

The controller 7 changes the signal level of the protocol selector signal 9 into a low level at a step 104. As a result, the low-level signal is transferred to the controller 11 provided in the personal computer main body 2. At a step 125, the controller 11 provided in the personal computer main body 2 confirms that the value of the protocol selector signal 9 becomes a low level. At a step 126, the controller 11 is brought into a waiting state until the signal level of the protocol selector signal 9 becomes a high level. At a step 105, the controller 7 provided in the pointing device 1 confirms that the signal level of the protocol selector signal 9 is changed to a low level. In the case that the signal level of the protocol selector signal 9 is not changed into the low level, the pointing device 1 is set to operate in the compatibility mode (step 113), completing the operation process. Conversely, when the signal level of the protocol selector signal 9 is changed to the low level, the protocol selector signal is in the state shown in time instant t2 of 25 FIG. 2. At a step 106, the controller 7 is put into a waiting state for a predetermined time period. At a further step 107, the signal level of the protocol selector signal 9 is set to a high level. The high-level protocol selector signal 9 is in the state shown in a time instant t3 of FIG. 2.

The controller 7 provided in the pointing device 1 confirms at a step 108 that the signal value of the protocol selector signal 9 has been changed to the high level. If this signal value of the protocol selector signal 9 has not yet been changed to the high level, then the pointing device 1 is operated in the compatibility mode. Conversely, when the signal level of this protocol selector signal 9 has been changed to the high level, the controller 7 in the pointing device 1 is put into a waiting state until the signal value of the protocol selector signal 9 becomes a low level at a step 109. During this waiting state, the controller 11 provided in the personal computer main body 2 can confirm that the signal level of the protocol selector signal 9 is at the high level, and therefore can notify this confirmation result to the central control apparatus 15.

When the central control apparatus 15 issues the selection instruction, the controller 11 sets the signal level of the protocol selector signal 9 to a low level at a step 128. As a result, the controller 7 provided in the pointing device 1 is recovers from the waiting state, and can be transitioned in state to be operable in a new function mode at a step 129.

When a transfer preparation notice is sent to the selector 12, the selector 12 separates the pointing device control signal 10 from the compatibility function providing circuit 14 and the new function control circuit 13 in order to protect the compatibility function providing circuit 14 and the new function control circuit 13. Thereafter, the selector 12 is put into a waiting state for a predetermined time period at a step 130. The steps are taken since the format of the signal on the lower digit side is changed, and there are certain possibilities that noise is mixed with the signal, resulting in erroneous operation. In addition, there is the possibility that the circuit may be destroyed because of the possibility of data collisions.

The controller 7 provided in the pointing device 1 senses that the signal level of the protocol selector signal 9 becomes a low level at a step 109. At the next step 110, in order to prepare for transitioning into the new function mode, the pointing device operating unit 3 sends a signal to the compatibility function signal producing circuit 5, the new function signal producing circuit 4, and the selector 6. The selector 6 cuts a signal/circuit relationship between the new function signal producing circuit 4 and the pointing device control signal 10. The controller 7 changes the signal level of the protocol selector signal 9 into a low level at a step 111. At a step 112, the controller 7 commands a connection change by the selector 6 to permit a transition to the new function mode. The selector 9 selects a circuit arrangement that permits the signal produced from the new function signal producing circuit 4 flow flow into the pointing device control signal 10. Upon receipt of an instruction issued from the controller 7, the compatibility function signal producing circuit 5 stops operation. Upon receipt of an instruction issued from the controller 7, the new function signal producing circuit 4 is initialized by itself and commences operation. The controller 11 is put into a waiting state for a preselected time period (namely, until pointing device 1 is reinitialized) at a step 130, and then sets the signal level of the protocol selector signal 9 to a high level at a further step 131. Under this condition, the protocol selector signal 9 is put into a state defined at a time instant "t5" to FIG. 2. If the pointing device 1 is reinitialized under normal operating conditions, the state of the protocol selector signal 9 is judged at a step 132 to be a low level. Since the personal computer main body 2 operates in a new mode at a step 133, the controller 11 issues an instruction to the selector 12. The selector 12 selects a circuit connection that permits the pointing device control signal 10 to be transferred to the new function control circuit 13. Under this condition, if the pointing device 1 is operated, then a signal is sent to the new function signal producing circuit 4, so that a signal corresponding to the new function is produced. This signal is transferred to the selector 6, and thereafter is supplied via the pointing device control signal 10 to the selector 12. The selector 12 is set to pass the signal to the new function control circuit 13. The new function control circuit 13 directs the signal to the central control apparatus 15, so that the new function can be employed.

The new function control circuit 13 also converts the signal, and the converted signal is transferred to the compatibility function providing circuit 14. As a result, a compatibility signal may be generated and be transferred to the central control apparatus 15, thus maintaining the features of a compatible mode. The controller 11 in the PC main body 2 is put into a waiting state until the signal level of the protocol selector signal 9 becomes a high level at a step 134. When the pointing device 1 is cut out under this condition, since there is no factor capable of lowering the signal level of the protocol selector signal 9 to the low level. The protocol selector signal level becomes a high level as represented by time instant "t7" in FIG. 2. As a consequence, the operation process of the controller 11 provided in the PC main body 2 is returned to continue operation at the step 123. At the step 123, the controller 11 is put into a waiting state until the pointing device 1 is newly connected to the PC main body 2.

A description of operations executed when a conventional type pointing device follows. The conventional type pointing device is not equipped with a new function is connected to the personal computer main body 2 capable of receiving the new function.

Because the conventional type pointing device is not equipped with the above-explained new function signal producing circuit 4, controller 7, and selector 6, the signal of the pointing device operating unit 3 is directly transferred to the pointing device control signal 10. The protocol selector signal 9 is not connected to the personal computer main body 2. As a result, the signal derived from the pointing device operating unit 3 is transferred through the compatibility function signal producing circuit 5 directly to the PC main body 2.

When the power supply of the PC main body 2 is turned ON, the operation process thereof is commenced. Referring to FIG. 5, the value of the protocol selector signal 9 is set to a high level in the step 124, and cannot be changed to a low level because there is no connection from the pointing device 1. Thus, the value of the protocol selector signal 9 is not changed to a low level at the step 125, and the operation process of the controller 11 enters an infinite loop. As a result, the operation mode of the PC main body 2 cannot be transferred to the new function mode. The selector 12 causes data to flow through the compatibility function providing circuit 14, which provides the compatibility function to the central control apparatus 15, and no new function is thus provided.

Furthermore, a description will now be made of the operations executed when the pointing device equipped with the new function is connected to a PC (personal computer) which cannot interpret the new function. In this instance, the PC main body 2 is not equipped with the controller 11, the selector 12, and the new function control circuit 13. The pointing device control signal 10 is instead directly supplied via the compatibility function providing circuit 14 to the central control apparatus 15.

Also, the protocol selector signal 9 is put into a NC condition when connected to the PC main body 2. When the pointing device 1 equipped with the new function is connected to this PC main body 2 under the condition, this pointing device 1 executes the initializing operation, and commences operation in the compatibility mode.

The controller 7 of this pointing device 1 executes the operation process shown in FIG. 4 up to the step 107, so that the controller 7 tries to change the signal level of the protocol selector signal 9 to a high level. Since there is no pull-up Vcc of FIG. 3 present in this instance, the protocol selector signal 9 cannot reach a high level. As a result, the operation process defaults to a low level branch at the step 108 shown in FIG. 4. The pointing device 1 is then secured for operation in the compatibility mode at a step 113.

It should also be noted that although this embodiment has described the pointing device 1, other electronic devices such as a printer, a disk drive, and a keyboard may be operated in plural modes by employing a similar new function system. If electronic devices such as these are connected via an interface having a non-connected signal line in the conventional compatibility mode to the PC main body, the system according to the present invention can be used to provide new functionality. For example, a keyboard is operable in response to only a present key signal and a small number of control commands. Alternatively, a new keyboard may be used as a composite device (namely, a combination of mouse and keyboard), using this inventive technique. As another example, a printer that supplies a large amount of data in response to a control signal, typically uses only data pins. Through the system according to the present invention, a FAX control signal may also be assembled and used in conjunction with existing hardware.

In such the case where the pointing device equipped with the new function is used only with a PC main body equipped with the new function, the compatibility function signal producing circuit 5 is no longer required in the pointing device. If the compatibility function signal producing circuit 5 is removed, the pointing device can no longer provide the compatibility function. However, when the machine is initialized, the operation mode of the PC main body is switched to the new function control mode and both the new function realized by the new function control circuit 13 and the compatibility function realized by the compatibility function providing circuit 14 can be provided. Consequently, the circuit components for providing the compatibility function of the pointing device is not required.

As previously described in detail, the present invention possesses the features listed as follows. The PC main body can provide a conventional compatibility function for the pointing device. The PC main body is provided with the compatibility function circuit, and both the PC main body and the pointing device are operated in compatibility mode until a control signal is switched by the. protocol selector.

Only when both the pointing device and the PC main body can support the new function, can the operation mode be transferred to the new function mode. When only one of these devices supports the new function, the switching control of the protocol selector signal cannot be carried out under normal condition.

However, when the protocol selector signal cannot be switched, the device can be operated in the conventional compatibility mode. Until both devices initialize to select the protocol selector signal, the devices are operated in the compatibility mode.

It is thus apparent that the present invention is not limited to the above embodiments but may be changed and modified without departing from the scope and spirit of the invention.

What is claimed is:

1. A method for controlling a pointing device and a computer main body connected with said pointing device, the method comprising:

transmitting a protocol between said pointing device and said computer main body by using an undefined signal line among a plurality of signal lines of a connector connecting said pointing device to said computer main body;

confirming operating states of controllers employed in both said pointing device and said computer main body while transmitting said protocol; and changing an operating mode of said computer main body into an additional function mode when said operating states of both said pointing device and said computer main body are confirmed as being capable of utilizing an additional function of said pointing device.

2. The method according to claim 1, further comprising:

placing said computer main body in a waiting state;

operating said pointing device and said computer main body in an original compatibility mode when said computer main body is placed in said waiting state;

carrying out a protocol transmission between said controllers employed in both said pointing device and said computer main body to check whether said additional function of said pointing device is usable; and issuing a mode switching instruction from a central control apparatus of said computer main body to said controllers employed in both said pointing device and said computer main body after said operating states of both said pointing device and said computer main body are confirmed as being capable of utilizing said additional function of said pointing device.

* * * * *